United States Patent
Hao

(10) Patent No.: US 10,423,018 B2
(45) Date of Patent: Sep. 24, 2019

(54) DISPLAY PANEL WITH AMPLIFYING CIRCUIT CONFIGURED TO AMPLIFY SCANNING SIGNAL AND LIQUID CRYSTAL DISPLAY

(71) Applicant: Shenzhen China Star Optoelectronics Technology Co., Ltd., Shenzhen, Guangdong (CN)

(72) Inventor: Sikun Hao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 43 days.

(21) Appl. No.: 15/552,727

(22) PCT Filed: Jun. 13, 2017

(86) PCT No.: PCT/CN2017/088018
§ 371 (c)(1),
(2) Date: Aug. 22, 2017

(87) PCT Pub. No.: WO2018/196116
PCT Pub. Date: Nov. 1, 2018

(65) Prior Publication Data
US 2018/0314090 A1    Nov. 1, 2018

(51) Int. Cl.
*G02F 1/133* (2006.01)
*G09G 3/36* (2006.01)

(52) U.S. Cl.
CPC ....... *G02F 1/13306* (2013.01); *G09G 3/3611* (2013.01); *G09G 3/3677* (2013.01); *G09G 2310/0205* (2013.01); *G09G 2310/0291* (2013.01)

(58) Field of Classification Search
CPC .................. G02F 1/13306; G09G 3/3611
See application file for complete search history.

(56) References Cited

U.S. PATENT DOCUMENTS

| | | | |
|---|---|---|---|
| 2006/0007768 A1* | 1/2006 | Kim | G09G 3/3291 365/205 |
| 2009/0278782 A1* | 11/2009 | Chen | G09G 3/3677 345/100 |
| 2010/0066922 A1 | 3/2010 | Kumada | |
| 2014/0043373 A1 | 2/2014 | Kim | |

(Continued)

FOREIGN PATENT DOCUMENTS

| | | |
|---|---|---|
| CN | 103117051 A | 5/2013 |
| CN | 105469755 A | 4/2016 |
| CN | 106097949 A | 11/2016 |

*Primary Examiner* — Ryan A Lubit
(74) *Attorney, Agent, or Firm* — Andrew C. Cheng

(57) ABSTRACT

A display panel includes a plurality of amplifying circuits arranged in a non-display area and a plurality of gate lines. An input terminal of the amplifying circuit is connected to an output terminal of one or more cascade circuit. An output terminal of the amplifying circuit is connected to a gate line. The amplifying circuit is configured to adjust an output signal from the connected cascade circuit to be a scanning signal and output the scanning signal to the gate line. A liquid crystal display using the display panel is also proposed. The present disclosure simplifies the gate driving circuit, thereby solving the problem of unstable signal transmitting among various stages in the gate driving circuit.

7 Claims, 4 Drawing Sheets

(56) References Cited

U.S. PATENT DOCUMENTS

| | | | |
|---|---|---|---|
| 2014/0204011 A1* | 7/2014 | Hu .................. | G09G 3/3611 |
| | | | 345/100 |
| 2015/0248867 A1* | 9/2015 | Tan .................. | G09G 3/3648 |
| | | | 345/100 |
| 2015/0293638 A1 | 10/2015 | Nakanishi et al. | |
| 2017/0193891 A1* | 7/2017 | Park .................. | G09G 3/2092 |
| 2017/0263203 A1* | 9/2017 | Zhao .................. | G09G 3/3677 |
| 2017/0329191 A1 | 11/2017 | Nakagawa | |
| 2018/0059829 A1* | 3/2018 | Chen .................. | G09G 3/36 |
| 2018/0182341 A1 | 6/2018 | Imajo et al. | |

* cited by examiner

DISPLAY PANEL WITH AMPLIFYING CIRCUIT CONFIGURED TO AMPLIFY SCANNING SIGNAL AND LIQUID CRYSTAL DISPLAY

BACKGROUND

1. Field of the Disclosure

The present disclosure relates to the field of display panels, and more particularly, a display panel and a liquid crystal display (LCD).

2. Description of the Related Art

An LCD is widely applied to a display terminal, such as a mobile communication device, personal computers (PCs), televisions (TVs) and so on owing to its advantages of high display quality, low price, portable convenience, etc.

Generally, the LCD is formed by upper and lower substrates and a liquid crystal layer inserted between the upper and lower substrate. The substrate is formed by glass, electrodes and so on. One method of gate driving is to fabricate a gate driving circuit on a chip on film (COF) and then to bond the COF to a display panel or to bond the gate driving circuit to a display panel directly, which costs a lot in production. The gate driving circuit is more vulnerable to wear and tear once the load of the display panel is heavy, which causes the gate driving circuit at high temperature. Besides, stage-transmittance abnormality easily occurs to the LCD produced by means of gate driving, thereby deteriorating the display quality when the LCD is used in a particular environment like in a high-temperature or low-temperature environment.

SUMMARY

An object of the present disclosure is to propose a display panel and a liquid crystal display (LCD) to solve stage-transmittance abnormality easily occurring to a corresponding gate driving circuit.

According to the present disclosure, a display panel comprises a plurality of amplifying circuits arranged in a non-display area and a plurality of gate lines. An input terminal of the amplifying circuit is connected to an output terminal of one or more cascade circuit; an output terminal of the amplifying circuit is connected to a gate line; the amplifying circuit is configured to adjust an output signal from the connected cascade circuit to be a scanning signal and output the scanning signal to the gate line. The amplifying circuit comprises an even number of inverters connected in series; each of the amplifying circuits is connected to one of the cascade circuits in the gate driving circuit. Each of amplifying circuits is connected to three cascade circuits correspondingly; an nth amplifying circuit comprises a first switch, a second switch, a third switch, and a fourth switch. A control terminal and an input terminal of the first switch are connected to an output terminal of an (n+i)th cascade circuit. An output terminal of the first switch is connected to a control terminal of the second switch and an input terminal of the third switch. An input terminal of the second switch is connected to a first voltage. An output terminal of the second switch is connected to an input terminal of the fourth switch. A control terminal of the third switch and a control terminal of the fourth switch both are connected to an output terminal of an (n+j)th cascade circuit; an output terminal of the third switch and a output terminal of the fourth switch both are connected to a second voltage level. The output terminal of the first switch and the control terminal of the second switch both are connected to an output terminal of an (n+k)th cascade circuit where n, i, j, and k represent different values; the n is an integer selected from a range of (0, N); i, j, and k are integers selected from a range of [−n, N−n]. The N represents total number of the amplifying circuit.

According to the present disclosure, a display panel includes a plurality of amplifying circuits arranged in a non-display area and a plurality of gate lines. An input terminal of the amplifying circuit is connected to an output terminal of one or more cascade circuit. An output terminal of the amplifying circuit is connected to a gate line. The amplifying circuit is configured to adjust an output signal from the connected cascade circuit to be a scanning signal and output the scanning signal to the gate line.

According to the present disclosure, a liquid crystal display (LCD) includes a display panel. The display panel includes a plurality of gate lines and a plurality of amplifying circuits; an output terminal of the amplifying circuit being connected to a gate line. A gate driving circuit includes a plurality of cascade circuits. An input terminal of the amplifying circuit is connected to an output terminal of the one or more cascade circuit; the output terminal of the amplifying circuit is connected to a gate line. The amplifying circuit is configured to adjust an output signal from the connected cascade circuit to is a scanning signal and output the scanning signal to the gate line.

The present disclosure will bring some benefits. In the present disclosure, an amplifying circuit is arranged in a non-display area of a display panel so that each gate line can pass the amplifying circuit while entering the display area. Compared with the related art, the amplifying circuit is no longer arranged in the gate driving circuit in the present disclosure, which not only simplifies the gate driving circuit but also reduces power consumption of the gate driving circuit, thereby solving the problem of unstable signal transmitting among various stages in the gate driving circuit.

DETAILED DESCRIPTION OF THE EMBODIMENTS

The drawings illustrate embodiments of the invention and, together with the description, serve to explain the principles of the invention.

Figure 1:
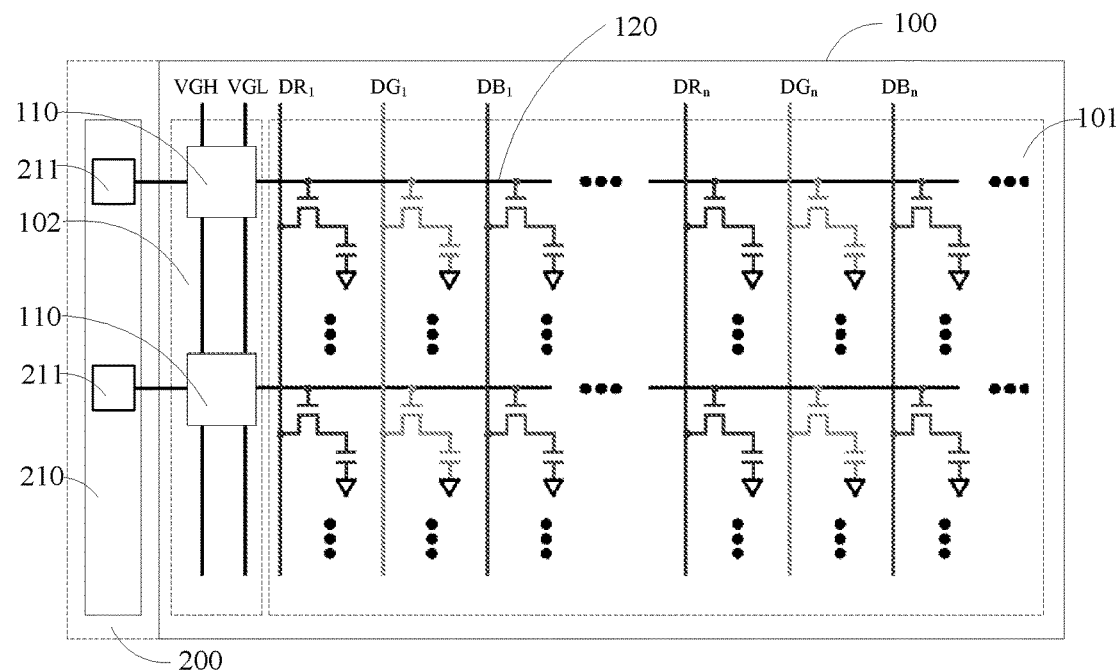
FIG. 1 illustrates a schematic diagram of the structure of a display panel according to a first embodiment of the present disclosure.

FIG. 1 illustrates a schematic diagram of the structure of a display panel 100 according to a first embodiment of the present disclosure.

In the first embodiment, the display panel 100 includes a plurality of amplifying circuits 110 and a plurality of gate lines 120. The display panel 100 is divided into a display area 101 and a non-display area 102. The plurality of amplifying circuits 110 are arranged in the non-display area 102. The plurality of gate lines 120 is arranged in the display area 101. Each pixel corresponds to three data lines (not illustrated) and a gate line 120 on the display area 101. A gate line 120 is arranged horizontally along a display area 101, and a data line is arranged longitudinally along the display area 101.

An input terminal of the amplifying circuit 110 is connected to an output terminal of one or more cascade circuit 211 in a gate driving circuit 210, and an output terminal of the amplifying circuit 110 is connected to one of the plurality of gate lines 120. Each amplifying circuit 110 is configured to adjust an output signal from the connected cascade circuit 211 to be a scanning signal and output the scanning signal to the gate line 120.

In the first embodiment, the amplifying circuit 110 is arranged on the non-display area 102 of the display panel 100, and each of the plurality of gate lines 120 passes one of the amplifying circuits 110 before entering the display area 101. Since the amplifying circuit 110 is not arranged in the gate driving circuit 210, not only the structure of the gate driving circuit 210 is simplified but also the gate driving circuit 210 consumes less power. Compared with the related art, the unstable of stage-transmittance in the gate driving circuit 210 is solved in the present disclosure.

The plurality of amplifying circuits 110 are arranged on one side of the display area 101 in this embodiment so the plurality of amplifying circuits 110 are arranged longitudinally along the display area 101. Meanwhile, the display area 101 and the non-display area 102 are divided on the display panel 100 horizontally since the plurality of amplifying circuits 110 are arranged on the non-display area 102.

Further, the gate driving circuit 210 is arranged on an area corresponding to the display panel 100, and the area is different from the non-display area 102. The amplifying circuit 110 is arranged on the non-display area 102 so that the gate driving circuit 210 and the amplifying circuit 110 are arranged on different areas. Such an arrangement simplifies the gate driving circuit and reduces power consumption of the gate driving circuit, thereby overcoming unstable stage-transmittance occurring to the gate driving circuit. Specifically, the gate driving circuit 210 is arranged on a bezel area 200 of the LCD. An area corresponds to the display panel 100 and differs from the non-display area 102 is the bezel area 200. It is notified that the bezel area 200 illustrated on the figure is simply illustrative. In another embodiment, a bezel area 200 further includes an area corresponding to upper and lower sides of the display panel 100.

Figure 2:
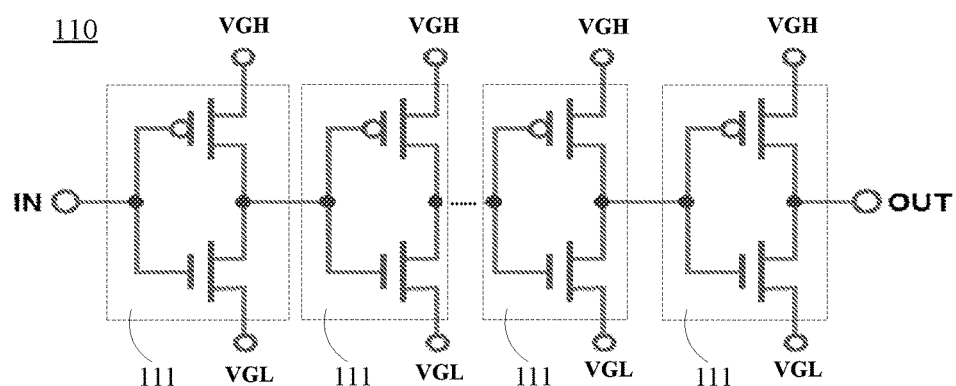
FIG. 2 illustrates a schematic diagram of the amplifying circuit according to the first embodiment of the present disclosure.
Figure 3:
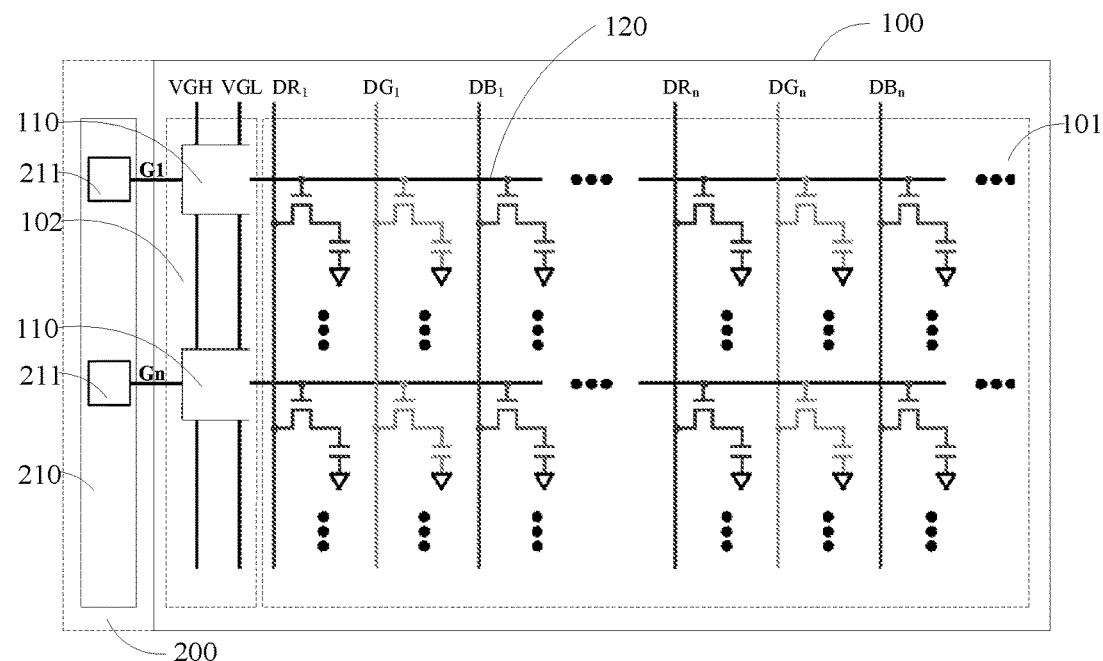
FIG. 3 illustrates a schematic diagram of a display panel using the amplifying circuit illustrated in FIG. 2.

FIG. 2 illustrates a schematic diagram of the amplifying circuit 110 according to the first embodiment of the present disclosure. The amplifying circuit 110 includes an even number of inverters 111 connected in series. Each-stage plurality of amplifying circuits 110 are connected to one of the cascade circuits 211 in the gate driving circuit 210. The polarity of the input of the amplifying circuit 110 is identical to the polarity of the output of the amplifying circuit 110 because of the even number of inverters 111 such as two or four inverters 111 connected in series. FIG. 3 illustrates a schematic diagram of a display panel using the amplifying circuit 110 illustrated in FIG. 2. An input terminal of the amplifying circuit 110 is connected to one of the cascade circuits 211 in the gate driving circuit 210, and the output terminal of the amplifying circuit 110 is connected to the gate line 120.

Figure 4:
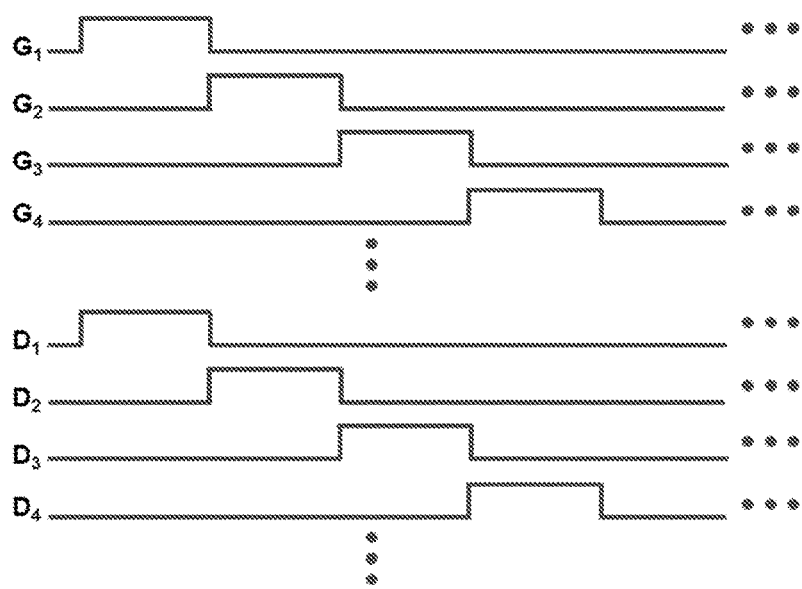
FIG. 4 illustrates a working waveform diagram of the display panel as illustrated in FIG. 3.

FIG. 4 illustrates a working waveform diagram of the display panel as illustrated in FIG. 3. When the cascade circuit 211 outputs a first voltage-level signal, the amplifying circuit 110 connected to the cascade circuit 211 outputs an amplified first voltage-level signal to the gate line 120 to drive a switch connected to the gate line 120. The first voltage-level signal is a high voltage-level signal in this embodiment. As FIG. 3 illustrates, a first-cascade circuit 211 outputs the high voltage-level signal, the voltage-level signal passes the amplifying circuit 110, and the amplified voltage-level signal is output to the corresponding gate line 120. At this time, the switch connected to the corresponding gate line 120 is turned on to activate the corresponding pixel to work and thereby display. Afterwards, a second-cascade circuit 211 outputs the high voltage-level signal, the voltage-level signal passes the amplifying circuit 110, and the amplified voltage-level signal is output to the corresponding gate line 120. At this time, the switch connected to the corresponding gate line 120 is turned on to activate the corresponding pixel to work and thereby display. A following process is similar to the first and second-cascade circuits 211, which is should be understood by a person skilled in the art, so the present embodiment will not go into detail. It is notified that D1, D2, etc. illustrated in FIG. 3 indicate the signals output by the switch connected to the gate line 120 after the first voltage-level signals pass the amplifying circuit 110. In other words, D1, D2, etc. indicate the signals of nodes connected to the data lines.

Figure 5:
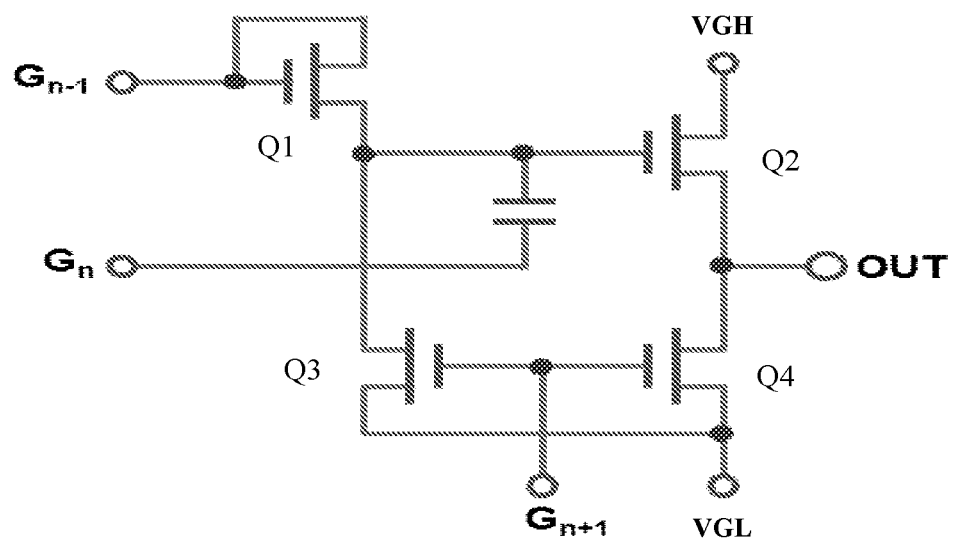
FIG. 5 is a schematic diagram of an amplifying circuit according to a second embodiment of the present disclosure.

FIG. 5 is a schematic diagram of an amplifying circuit 110 according to a second embodiment of the present disclosure. Each amplifying circuit 110 is connected to three cascade circuits 211 correspondingly. An nth amplifying circuit 110 includes a first switch Q1, a second switch Q2, a third switch Q3, and a fourth switch Q4. A control terminal and an input terminal of the first switch Q1 both are connected to an output terminal of an (n+i)th cascade circuit 211, and an output terminal of the first switch Q1 is connected to a control terminal of the second switch Q2 and an input terminal of the third switch Q3. An input terminal of the second switch Q2 is connected to a first voltage VGH. An output terminal of the second switch Q2 is connected to an input terminal of the fourth switch Q4. A control terminal of the third switch Q3 and a control terminal of the fourth switch Q4 both are connected to an output terminal of an (n+j)th cascade circuit 211. An output terminal of the third switch Q3 and an output terminal of the fourth switch Q4 both are connected to a second voltage level VGL. The output terminal of the first switch Q1 and the control terminal of the second switch Q2 both are connected to an output terminal of an (n+k)th cascade circuit 211. It is notified that n, i, j, and k represent different values; n indicates (0, N); i, j, and k indicate [−n, N−n]; N represents total number of the amplifying circuit 110. The first switch Q1, the second switch Q2, the third switch Q3, and the fourth switch Q4 are of the same type. For example, all of the switches are N-type field effect transistors (FETs). In another embodiment, i is −1, j is 1, and k is 0.

Figure 6:
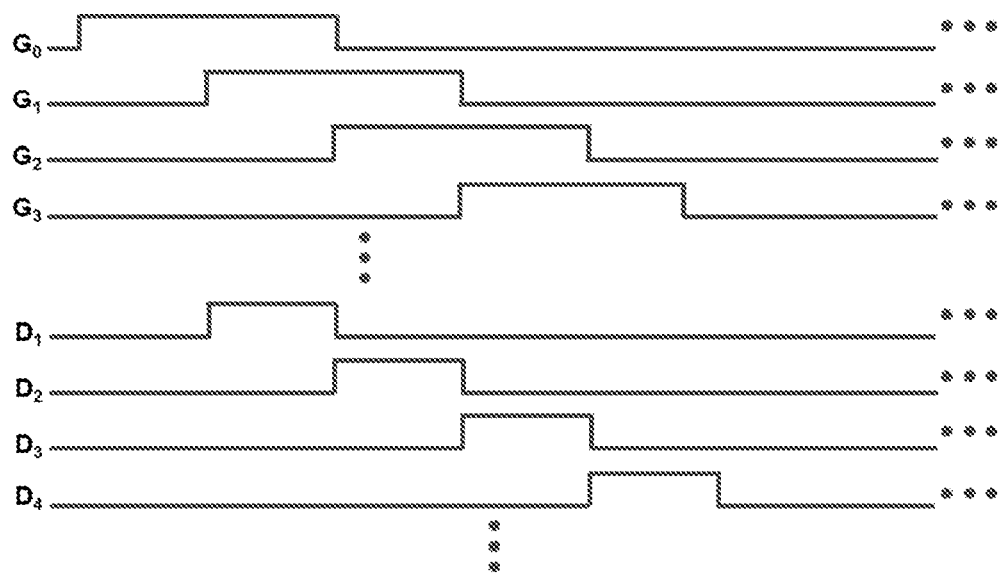
FIG. 6 illustrates a schematic diagram of the structure of the display panel according to the second embodiment of the present disclosure.
Figure 7:
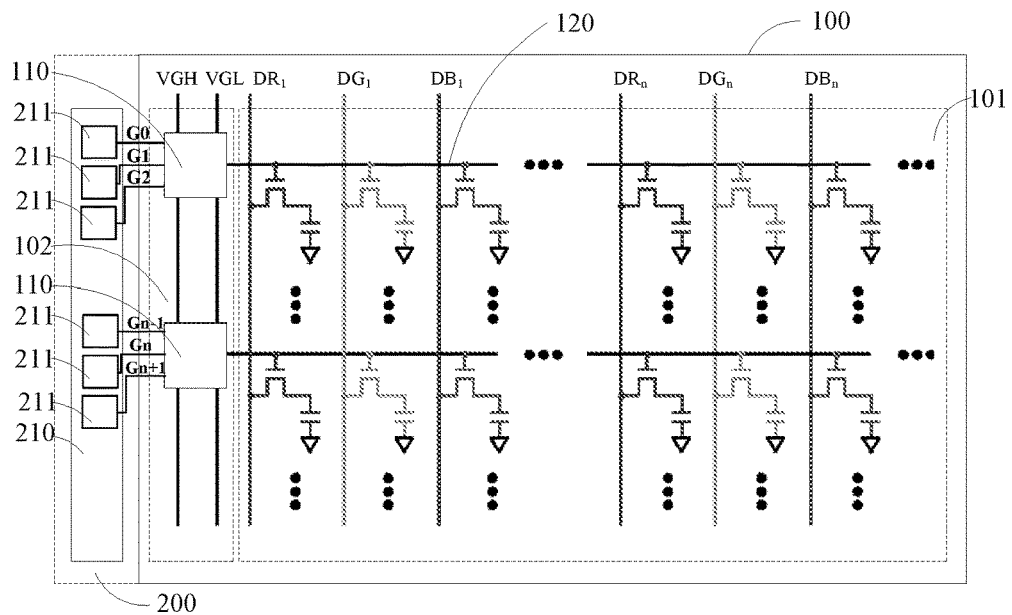
FIG. 7 illustrates a waveform of the display panel as illustrated in FIG. 6.

FIG. 7 illustrates a schematic diagram of the structure of the display panel 100 according to the second embodiment of the present disclosure. Input terminals Gn−1, Gn, and Gn+1 of the amplifying circuit 110 are connected to the three-cascade circuits 211 correspondingly. FIG. 6 illustrates a waveform of the display panel as illustrated in FIG. 7. When an (n+i)th cascade circuit 211 and an (n+k)th cascade circuit 211 both output the first voltage-level signal, the nth amplifying circuit 110 outputs the first voltage-level signal to the nth gate line 120 to drive the switch connected to the gate line 120. The first voltage-level signal is a high voltage-level signal in this embodiment. How the amplifying circuit 110 outputs and inputs practically is illustrated in FIG. 6 and will not be detailed here. It is notified that D1, D2, etc. illustrated in FIG. 6 indicate the signals output by the switch connected to the gate line 120 after the first voltage-level signals pass the amplifying circuit 110. In other words, D1, D2, etc. indicate the signals of nodes connected to the data lines.

Figure 8:
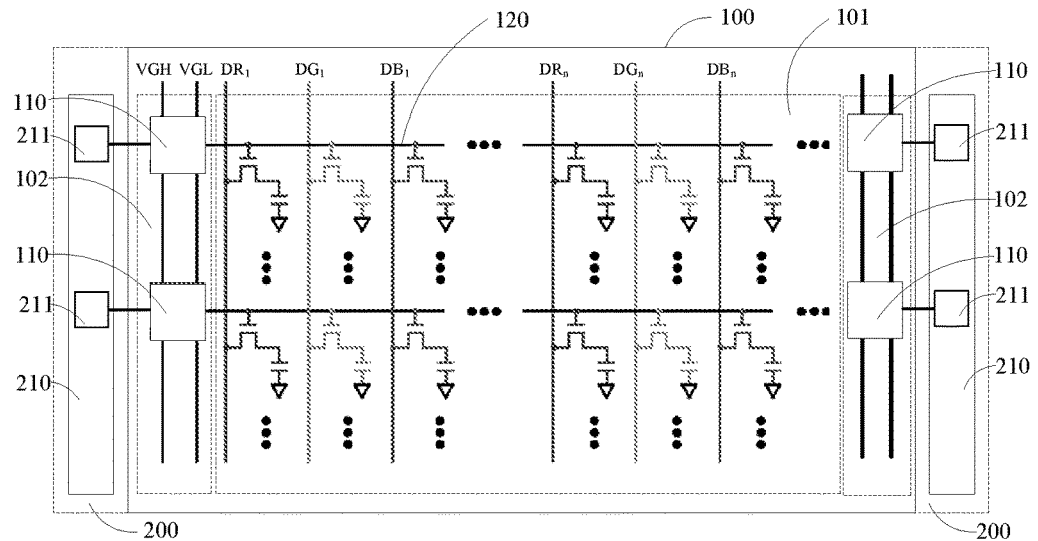
FIG. 8 illustrates a schematic diagram of the structure of a display panel according to a second embodiment of the present disclosure.

FIG. 8 illustrates a schematic diagram of the structure of a display panel according to a second embodiment of the present disclosure. Differing from the display panel 100 proposed by the first embodiment, the number of each amplifying circuits 110 are two, and the two each amplifying circuits 110 are arranged on both sides of a display area 101 correspondingly proposed by the second embodiment. It is notified that the two each amplifying circuits 110 correspond to the same non-display area 102, the same gate driving circuit 210, and the same bezel area 200. Each of the amplifying circuits 110 and the introduction of each of the amplifying circuits 110 are as what is described in the first embodiment and can be referred directly so the present embodiment will not go into detail.

Figure 9:
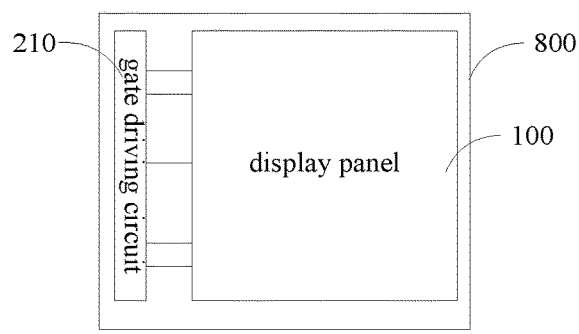
FIG. 9 illustrates a schematic diagram of the structure of a liquid crystal display (LCD) according to the second embodiment of the present disclosure.

FIG. 9 illustrates a schematic diagram of the structure of a liquid crystal display (LCD) 100 according to the second embodiment of the present disclosure. The LCD 100 includes the display panel 100 and the gate driving circuit 210. Accompanied by FIG. 1 or FIG. 8, the display panel 100 includes a plurality of gate lines 120 and a plurality of amplifying circuits 110. An output terminal of the amplifying circuit 110 is connected one of the plurality of gate lines 120. The gate driving circuit 210 includes a plurality of cascade circuits 211 (illustrated in the figures).

An input terminal of the amplifying circuit 110 is connected to an output terminal of one or more cascade circuit 211 in a gate driving circuit 210, and the output terminal of the amplifying circuit 110 is connected to one of the plurality of gate lines 120. Each amplifying circuit 110 is configured to adjust an output signal from the connected cascade circuit 211 to be a scanning signal and output the scanning signal to the gate line 120.

In another embodiment, accompanied by FIG. 2, an amplifying circuit 110 includes an even number of inverters 111 connected in series. Each amplifying circuit 110 is connected to one cascade circuit 211 in a gate driving circuit 210. The polarity of an input of the amplifying circuit 110 is identical to the polarity of an output of the amplifying circuit 110 because of the even number of inverters 111 such as two or four inverters 111 connected in series. FIG. 3 illustrates a schematic diagram of the structure of a display panel when the amplifying circuit 110 proposed by the first embodiment is adopted. An input terminal of the amplifying circuit 110 is connected to one of the cascade circuits 211 in the gate driving circuit 210, and an output terminal of the amplifying circuit 110 is connected to the gate line 120.

In another embodiment, accompanied by FIG. 5, each amplifying circuit 110 is connected to three-cascade circuits 211 correspondingly. The nth amplifying circuit 110 includes a first switch Q1, a second switch Q2, a third switch Q3, and a fourth switch Q4. A control terminal and an input terminal of the first switch Q1 both are connected to an output terminal of an (n+i)th cascade circuit 211, and an output terminal of the first switch Q1 is connected to a control terminal of the second switch Q2 and an input terminal of the third switch Q3. An input terminal of the second switch Q2 is connected to the first voltage VGH. An output terminal of the second switch Q2 is connected to an input terminal of the fourth switch Q4. A control terminal of the third switch Q3 and a control terminal of the fourth switch Q4 both are connected to an output terminal of an (n+j)th cascade circuit 211. An output terminal of the third switch Q3 and an output terminal of the fourth switch Q4 both are connected to the second voltage level VGL. An output terminal of the first switch Q1 and a control terminal of the second switch Q2 both are connected to an output terminal of an (n+k)th cascade circuit 211. It is notified that n, i, j, and k represent different values, the n is an integer selected from a range of (0, N), i, j, and k are integers selected from a range of [−n, N−n], the N represents total number of the amplifying circuit 110. The first switch Q1, the second switch Q2, the third switch Q3, and the fourth switch Q4 are of the same type. For example, all of the switches are N-type field effect transistors (FETs).

It is noted that the display panel of the present disclosure is depicted as above embodiments. Compared with the related art, the amplifying circuit 110 is no longer arranged in the gate driving circuit 210 in the present disclosure, which not only simplifies the gate driving circuit but also reduces power consumption of the gate driving circuit, thereby solving the problem of unstable signal transmitting among various stages in the gate driving circuit.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A display panel, comprising a plurality of amplifying circuits arranged in a non-display area and a plurality of gate lines, wherein an input terminal of the amplifying circuit is connected to an output terminal of one or more cascade circuit; an output terminal of the amplifying circuit is connected to a gate line; the amplifying circuit is configured to adjust an output signal from the connected cascade circuit to be a scanning signal and output the scanning signal to the gate line;

wherein each of amplifying circuits is connected to three cascade circuits correspondingly; an nth amplifying circuit comprises a first switch, a second switch, a third switch, and a fourth switch; a control terminal and an input terminal of the first switch are connected to an output terminal of an (n+i)th cascade circuit; an output terminal of the first switch is connected to a control terminal of the second switch and an input terminal of the third switch; an input terminal of the second switch is connected to a first voltage; an output terminal of the second switch is connected to an input terminal of the fourth switch; a control terminal of the third switch and a control terminal of the fourth switch both are connected to an output terminal of an (n+j)th cascade circuit; an output terminal of the third switch and an output terminal of the fourth switch both are connected to a second voltage level; the output terminal of the first switch and the control terminal of the second switch both are connected to an output terminal of an (n+k)th cascade circuit where n, i, j, and k represent different values; the n is an integer selected from a range of (0, N); i, j, and k are integers selected from a range of [−n, N−n]; the N represents total number of the amplifying circuit.

2. The display panel of claim 1, wherein when the (n+i)th cascade circuit and the (n+k)th cascade circuit both output a first voltage-level signal, the nth amplifying circuit outputs the first voltage-level signal to an nth gate line to drive the switch connected to the gate line.

3. The display panel of claim 2, wherein the i is −1; the j is 1; the k is 0.

4. The display panel of claim 1, wherein the amplifying circuits are arranged on one side of a display area of the display panel; or two of the amplifying circuits are arranged on both sides of the display area correspondingly.

5. The display panel of claim 1, wherein the gate driving circuit is arranged on an area corresponding to the display panel, and the area is different from the non-display area.

6. A liquid crystal display (LCD), comprising:

a display panel, comprising a plurality of gate lines and a plurality of amplifying circuits; an output terminal of the amplifying circuit being connected to a gate line;

a gate driving circuit, comprising a plurality of cascade circuits;

wherein an input terminal of the amplifying circuit is connected to an output terminal of the one or more cascade circuit; the output terminal of the amplifying circuit is connected to a gate line; the amplifying circuit is configured to adjust an output signal from the connected cascade circuit to is a scanning signal and output the scanning signal to the gate line;

wherein each of amplifying circuits is connected to three cascade circuits correspondingly; an nth amplifying circuit comprises a first switch, a second switch, a third switch, and a fourth switch; a control terminal and an input terminal of the first switch are connected to an output terminal of an (n+i)th cascade circuit; an output terminal of the first switch is connected to a control terminal of the second switch and an input terminal of the third switch; an input terminal of the second switch is connected to a first voltage; an output terminal of the second switch is connected to an input terminal of the fourth switch; a control terminal of the third switch and a control terminal of the fourth switch both are connected to an output terminal of an (n+j)th cascade circuit; an output terminal of the third switch and an output terminal of the fourth switch both are connected to a second voltage level; the output terminal of the first switch and the control terminal of the second switch both are connected to an output terminal of an (n+k)th cascade circuit where n, i, j, and k represent different values; the n is an integer selected from a range of (0, N); i, j, and k are integers selected from a range of [−n, N−n]; the N represents total number of the amplifying circuit.

7. The LCD of claim 6, wherein when the (n+i)th cascade circuit and the (n+k)th cascade circuit both output a first voltage-level signal, the nth amplifying circuit outputs the first voltage-level signal to an nth gate line to drive the switch connected to the gate line.

\* \* \* \* \*